United States Patent Office.

RICHARD JONAS, OF NEW YORK, N. Y.

Letters Patent No. 80,353, dated July 28, 1868.

IMPROVED OINTMENT FOR HORSES, CATTLE, &c.

*The Schedule referred to in these Letters Patent and making part of the same.*

TO ALL WHOM IT MAY CONCERN:

Be it known that I, RICHARD JONAS, of the city, county, and State of New York, have invented a new and improved Ointment for Veterinary Practice; and I do hereby declare that the following is a full, clear, and exact description thereof, which will enable those skilled in the art to make and use the same.

This invention and discovery relate to a composition designed for healing purposes in the treatment of horses, cattle, and other domestic animals, and which may also be used with good effect upon the human body for the cure of wounds, bruises, and for other purposes.

Having for many years been engaged as a farrier and veterinary practitioner, I have ascertained from actual experience that many diseases in horses and cattle, which have heretofore been considered incurable, can be successfully treated by proper application of the remedy which I have discovered, and for which I ask protection.

In carrying out my invention, and forming the composition, I use the following ingredients, in about the proportions named, viz:

For seven and a half pounds of the ointment I use—

Two pounds of mutton-suet.
One pound of beef-suet.
One pound of hog's lard.
Half a pound of Venice turpentine.
Half a pound of white turpentine.
Half a pound of bees-wax.
One pound of honey.
One-fourth of a pound of balsam-fir.
One-fourth of a pound of castile soap.
One-fourth of a pound of verdigris.

The above ingredients are melted together and properly combined by stirring when in a heated state.

When the composition is allowed to cool it is of the consistency of soft paste or ointment, and is ready for use.

This ointment is a sure cure for all skin and surface diseases on horses and cattle, such as scratches, galls, cuts, and wounds of every description.

I claim as new, and desire to secure by Letters Patent—

An ointment composed of the above-mentioned ingredients in about the proportions named and for the purposes set forth.

RICHARD JONAS.

Witnesses:
FRANK BLOCKLEY,
ALEX. F. ROBERTS.